E. J. MICHAND.
LATHE DOG.
APPLICATION FILED SEPT. 6, 1911.
1,038,409.
Patented Sept. 10, 1912.
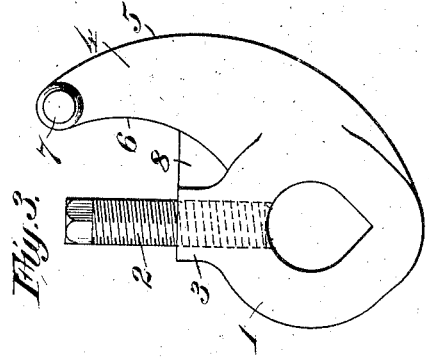
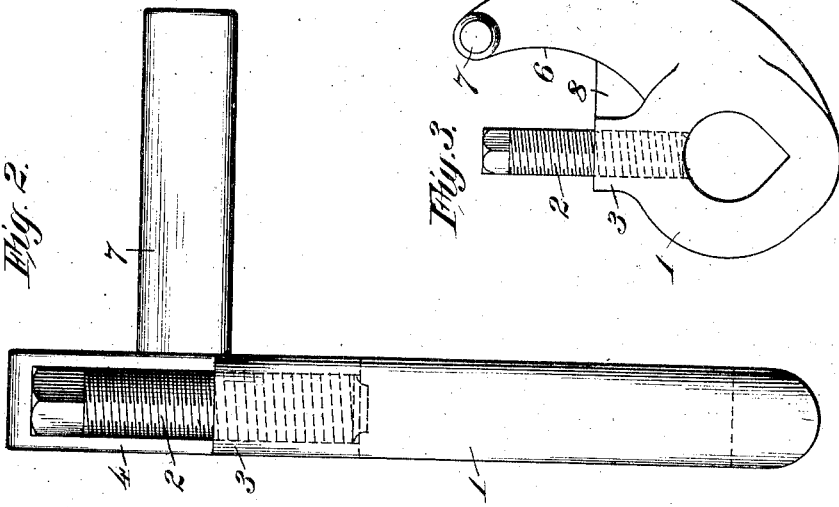
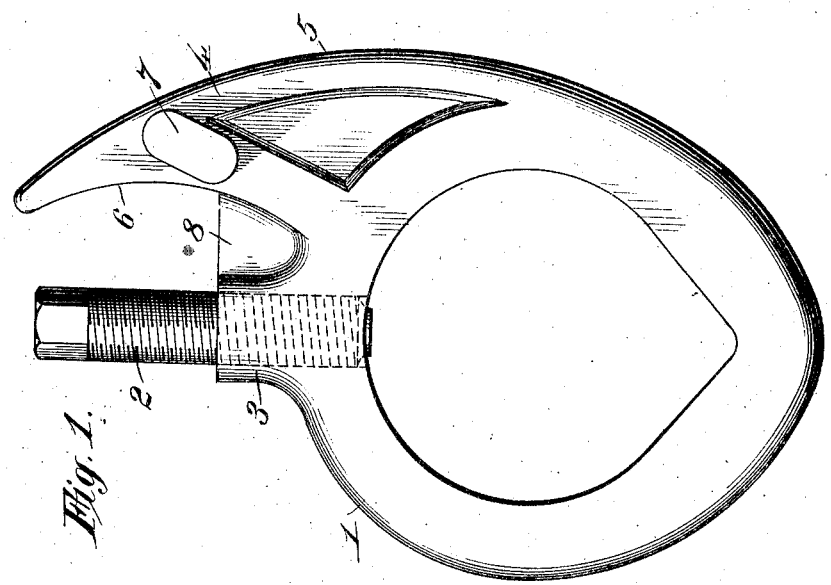
Witnesses
H. J. Austin
M. A. McAllister
Inventor
Elmer J. Michand
By Joshua R. H. Potts
Attorney

UNITED STATES PATENT OFFICE.

ELMER J. MICHAND, OF WILLIMANTIC, CONNECTICUT.

LATHE-DOG.

1,038,409.  Specification of Letters Patent.  Patented Sept. 10, 1912.

Application filed September 6, 1911. Serial No. 647,869.

*To all whom it may concern:*

Be it known that I, ELMER J. MICHAND, a citizen of the United States, residing at Willimantic, county of Windham, and State of Connecticut, have invented certain new and useful Improvements in Lathe-Dogs, of which the following is a specification.

My invention relates to lathe dogs, that is to the devices used for securing the work to the face plate.

In lathe dogs of the usual construction the clamping or set screw projects beyond the dog and is exposed in such a manner that the hands of the operator are frequently injured thereby.

The object of my invention is to provide a safety lathe dog, that is one in which the set screw shall be protected in such a manner as to prevent the hands or clothing of the operator being accidentally caught or injured by the same.

A further object of my invention is to provide a dog as mentioned which shall otherwise than above stated operate as the ordinary lathe dog.

Other objects will appear hereinafter.

With these objects in view my invention consists generally in a lathe dog comprising the ordinary ring and set screw, in combination with a tail extending outwardly adjacent said screw and projecting beyond the same and having its outer edge cam shaped or curved and merging into the curved periphery of the ring, and a stem projecting laterally from said tail to engage the face plate of the lathe.

My invention further consists in various details of construction and arrangements of parts all as will be fully described hereinafter and particularly pointed out in the claim.

My invention will be more readily understood by reference to the accompanying drawings forming a part of this specification and in which—

Figure 1 is a side elevation of a lathe dog embodying my invention in its preferred form, Fig. 2 is an edge view thereof, and Fig. 3 is a side elevation of a lathe dog such as used for small work, and embodying my invention.

Referring now to the drawings 1 indicates the usual ring and 2 the set or clamping screw threaded through the screw boss or crown 3. These portions of the device are of any ordinary or preferred form and I make no claim to the same *per se.*

Formed integrally with the ring 1 is a tail 4 extending outwardly adjacent to screw and of sufficient length to project beyond the same. The tail 4 is of substantially the same width as that of the ring 1, or greater than the diameter of the screw, and its outer edge 5 is cam shaped or curved and merges into the curve of the periphery of the ring 1. While the tail 4 is arranged adjacent the screw 2 it is spaced therefrom a sufficient distance not to interfere with the wrench used for turning the screw, and to give more room for the wrench the inner edge of the tail, that is the one adjacent the screw, is concavely formed as indicated at 6 in Figs. 1 and 3.

Projecting laterally from the tail 4 is a stem 7 adapted to engage the face plate of the lathe and impart rotation to the dog and hence to the work. In large dogs for heavy work the stem is arranged upon or projects from a broad or heavy portion of the tail such as that adjacent the web 8 which web extends between the crown 3 and the tail 4 to strengthen the latter. In dogs such as are used with light or small work the stem 7 may project from the tail at or adjacent its end as illustrated in Fig. 3.

In using the device it is secured to the work in the ordinary manner with the tail 4 in advance of the screw 2 with regard to the direction of rotation. It is obvious that when a dog of this construction is used it is impossible for the hands of the operator to be injured by the screw or for the clothing to be caught thereby.

Having described my invention, what I claim as new and desire to secure by Letters Patent is:

A lathe dog comprising a ring and a set screw threaded therethrough, in combination with a tail formed integrally with said ring and projecting outwardly adjacent said screw, said tail having an outer curved edge merging into the periphery of said ring, and a stem projecting laterally from said tail, substantially as described.

In testimony whereof I have signed my name to this specification in the presence of two subscribing witnesses.

ELMER J. MICHAND.

Witnesses:
TIMOTHY J. LEARY,
W. SMITH.